United States Patent
Dalke

(10) Patent No.: US 10,805,684 B2
(45) Date of Patent: Oct. 13, 2020

(54) SYSTEMS AND METHODS FOR CREATING AND EDITING MULTI-COMPONENT MEDIA

(71) Applicant: MINDHIVE INC., New York, NY (US)

(72) Inventor: George Dalke, Claremont, NH (US)

(*) Notice: Subject to any disclaimer, the term of this patent is extended or adjusted under 35 U.S.C. 154(b) by 0 days.

(21) Appl. No.: 15/644,255

(22) Filed: Jul. 7, 2017

(65) Prior Publication Data
US 2018/0376214 A1  Dec. 27, 2018

Related U.S. Application Data

(60) Provisional application No. 62/523,019, filed on Jun. 21, 2017.

(51) Int. Cl.
*H04N 21/472* (2011.01)
*G06F 3/0484* (2013.01)
(Continued)

(52) U.S. Cl.
CPC ..... *H04N 21/47205* (2013.01); *G06F 3/0484* (2013.01); *G11B 27/031* (2013.01); *G11B 27/10* (2013.01); *H04N 21/41407* (2013.01); *H04N 21/431* (2013.01); *H04N 21/4788* (2013.01); *H04N 21/47217* (2013.01); *H04N 21/8547* (2013.01)

(58) Field of Classification Search
CPC ......... H04N 21/47205; H04N 21/2187; H04N 21/23424; H04N 21/4788; H04N 21/47217; H04N 21/8456; H04N 21/242; H04N 21/8126; H04N 5/272; H04N 2007/145; H04N 21/234345; H04N 21/4113; H04N 21/4126; H04N 21/41407; H04N 21/42203; H04N 21/4302; H04N 21/4316; H04N 21/44213; H04N 21/4882; H04N 21/854; H04N 21/8547; H04N 5/04; H04N 21/4312; H04N 21/234363; H04N 21/235; G06F 3/0484; G06F 3/04842; G06F 3/04845; G06F 3/041; G06F 3/0414; G06F 3/0416; G06F 2203/04809; G06F 3/048; G06F 2203/04105; G06F 3/0481; G06F 3/0488; G06F 1/1694
USPC .......................................... 725/37; 715/800
See application file for complete search history.

(56) References Cited

U.S. PATENT DOCUMENTS 7,200,857 B1 *  4/2007  Rodriguez ........... H04N 21/235
                                                  375/E7.024
8,233,772 B1 *  7/2012  Young ................... H04N 5/783
                                                  386/278
(Continued)

OTHER PUBLICATIONS

Cunha, Bruna et al., MoViA: A Mobile Video Annotation Tool, Sep. 10-13, 2013, Proceeding, DocEng '13 Proceedings of the 2013 ACM Symposium on Document Engineering, pp. 219-222, Florence, Italy.*

*Primary Examiner* — Cynthia M Fogg
(74) *Attorney, Agent, or Firm* — Brown Rudnick LLP

(57) ABSTRACT

The invention relates to defining temporal and spatial relationships between components within a single piece, multi-component piece of content. Secondary components may comprise filters and may be used to allow for easy tracking of faces in videos to hide the identity of individuals. Methods of object tracking are also disclosed that may anticipate the off-camera movements of tracked objects based on prior observations to more quickly identify the objects upon return to the field of view.

16 Claims, 7 Drawing Sheets

(51) Int. Cl.
   *H04N 21/8547*    (2011.01)
   *H04N 21/4788*    (2011.01)
   *H04N 21/431*     (2011.01)
   *G11B 27/10*      (2006.01)
   *H04N 21/414*     (2011.01)
   *G11B 27/031*     (2006.01)

(56) References Cited

U.S. PATENT DOCUMENTS

| | | | | |
|---|---|---|---|---|
| 2003/0095720 A1* | 5/2003 | Chiu | ............... | H04N 5/262 |
| | | | | 382/284 |
| 2007/0245243 A1* | 10/2007 | Lanza | ............... | G06F 17/30817 |
| | | | | 715/723 |
| 2008/0094414 A1* | 4/2008 | Lin | ............... | G06K 9/00228 |
| | | | | 345/629 |
| 2008/0204427 A1* | 8/2008 | Heesemans | ............... | G06F 3/0414 |
| | | | | 345/174 |
| 2009/0150553 A1* | 6/2009 | Collart | ............... | G11B 27/34 |
| | | | | 709/229 |
| 2009/0297118 A1* | 12/2009 | Fink | ............... | G06F 17/3082 |
| | | | | 386/278 |
| 2010/0281376 A1* | 11/2010 | Meaney | ............... | G11B 27/034 |
| | | | | 715/723 |
| 2011/0258545 A1* | 10/2011 | Hunter | ............... | G06Q 10/10 |
| | | | | 715/716 |
| 2012/0062732 A1* | 3/2012 | Marman | ............... | H04N 7/18 |
| | | | | 348/142 |
| 2012/0151346 A1* | 6/2012 | McClements, IV | ............... | G06Q 10/101 |
| | | | | 715/716 |
| 2012/0194517 A1* | 8/2012 | Izadi | ............... | G06T 17/00 |
| | | | | 345/420 |
| 2013/0044130 A1* | 2/2013 | Geisner | ............... | G09G 5/00 |
| | | | | 345/633 |
| 2014/0028714 A1* | 1/2014 | Keating | ............... | G06T 19/006 |
| | | | | 345/633 |
| 2015/0033108 A1* | 1/2015 | Fitzmaurice | ............... | G06F 17/241 |
| | | | | 715/230 |
| 2015/0221112 A1* | 8/2015 | Mallik | ............... | G06T 11/60 |
| | | | | 345/636 |
| 2016/0231411 A1* | 8/2016 | Kumar | ............... | G01S 3/7864 |

* cited by examiner

SYSTEMS AND METHODS FOR CREATING AND EDITING MULTI-COMPONENT MEDIA

RELATED APPLICATIONS

This application claims priority to and the benefit of U.S. Provisional application Ser. No. 62/523,019, filed Jun. 21, 2017. The contents of the above-referenced application are incorporated by reference herein in their entirety.

FIELD OF THE INVENTION

The invention generally relates to managing spatial and temporal relationships between components of multi-component content.

BACKGROUND

With the advent of mobile smart phones and other communication devices capable of recording, sending, and receiving text, audio, video, images, and graphics, more and more people are recording and sharing experiences at an ever increasing rate. For example, people may record and share live video from a concert or share their thoughts on world events, as they unfold, with friends and/or strangers around the world. As more individuals augment their everyday experiences with technology by capturing and sharing thoughts and events in the moment, the need for instant communication has increased along with the need to make posted media stand out in a crowded landscape. Being the first to comment on an event or share a new video or photograph can carry personal import and in some cases, real value to people and businesses, especially if the content stands out. Unfortunately, these two interests are often at odds. As simple video or image posts become more common, individuals may want to annotate or layer their shared content with text, drawings, or even additional images or videos. While such compound content can serve as a differentiator, the complexity of creating and editing that content can take an immense amount of time, allowing the moment to pass and discouraging people from customizing their content due to the required time and effort. Furthermore, mobile devices, where much of today's content is generated, edited, and posted from, do not have the screen real estate to readily allow for conventional feature-rich video editing capabilities.

Additionally, as more and more content is shared online, protecting privacy has become a major concern. Specifically, obscuring faces or other identifiers in images and video can be desirable or, even essential in, for example, protecting one's own privacy or to avoid the need to obtain an individual's consent to use their likeness.

SUMMARY

The invention generally provides tools for creating and managing spatial and temporal relationships between components of media content. Specifically, systems and methods described herein relate to managing the various rates associated with components (e.g., video or animation speed or the speed of component movements) both relative to standard time and relative to each other. A timeline may be displayed associated with a primary or background (e.g., a background video) over which one or more blocks representing other time-dependent components (e.g., a shorter video overlay of commentary about a specific portion of the background video) may be placed to indicate where, in time, the other component appears with respect to the run-time of the background component. The timeline may have a first end representing the start of the primary component (e.g., a video's start) and a second end representing the finish of the primary component (e.g., the video's completion). The blocks are defined such that one end represents the start of the time-dependent component and the other end represents the finish of the time-dependent component. The relationship between the run speeds of the various components may then be defined by placing the start and finish points of the secondary time-dependent component at points along the background or primary component timeline. For example, expanding or contracting the size of the component block in relation to the background timeline may be used to define the run speed relationship.

For any given point of time along the timeline, one or more of the various time-dependent components may be selected to run at real-time speed. Accordingly, that selected component will run at real-time speed while the other components will run at a speed set by the relationship defined by the timeline and component-representative blocks.

The spatial relationship between multiple components may be defined through manipulation of objects representing the components. For example, the location of a secondary component displayed on top of a primary background component may be defined be dragging an image of the secondary component to the desired display location on the background component. The relative size and orientation may also be manipulated. Furthermore, spatial relationships may be defined as a function of the temporal relationship. For example, the position, size, and/or orientation of a secondary component with respect to a primary component may be changed over the run time of the primary or secondary component. The spatial-temporal relationship may be defined by manipulating the relative size, orientation, and position of one of the components while the other component is being run (e.g., a video being played, zooming in or out or panning over an image, or an animation being run). The relative size, orientation, and position may thereby be set for each time point along the run time of one or more of the components and stored in memory to be replayed.

In certain embodiments, the temporal relationship between two or more components may be defined by syncing a specific time point in one component with a specific time point in one or more other components. For example, a secondary time-dependent component may be paused at a time point in its run-time that a user desires to sync. The primary time-dependent component may then be played or otherwise moved to a specific time point in its run time that the user desires to sync. As the primary time-dependent component reaches the desired sync point, the secondary component may be un-paused. The paused point of the secondary component will then be synced with the desired sync point in the primary component's run time. Accordingly, the two synced points will thereafter be displayed at the same time. Any modifications to the relative run speeds of the two components (e.g., one playing at real time while the other is in slow motion) will be defined around the sync points.

Because locations of secondary components may be defined by a user over the run time of a primary component, systems and methods allow for user tracking of pixels or other sub-sets of a component. For example, those techniques may be used to define a portion of a primary, background component to be obscured or otherwise embellished (e.g., one or more faces in a video). In such an instance, the secondary component would be the embellishment which may include a filter to blur or pixelate the primary component at that location. A user may use an input device such as a finger on a touch screen to track the portion of the primary component to be embellished as the time-dependent primary component is played. In such embodiments, the size of the embellishment or secondary component may be defined, for example, by the pressure of the finger on the touch screen.

Further embodiments may include automatic tracking of a defined portion of a component (e.g., a face in a video) with spatial memory and anticipation. For example, techniques for automatic pixel tracking are known in the art but struggle with tracked portions leaving and returning to an image frame. These techniques may rely on defining edges based on color, brightness, and/or luminance changes in pixels and tracking those edges or the pixels as they move throughout an image frame or camera's field of view. If the object leaves the field of view and then returns, there is generally a delay before the computer recognizes that the tracked object has reappeared and should be modified. Systems and methods of the invention address this delay by tracking the object out of frame and/or anticipating the location of the object's return to frame in order to identify the object as soon as it enters the field of view. For example, the out-of-frame location of the tracked object may be estimated based on the recorded speed and trajectory of the object in-frame. A computer may create a model of the environment outside of the field of view based, for example, on panning of the camera, through GPS, or other means to contribute to out-of-frame location determination based on the location of, for example, walls or other objects that may affect the tracked object's movement. Sensors associated with the object may also be tracked (e.g., a cell phone or other device monitored via GPS or Wi-Fi triangulation) and their relationship to the tracked object may be used to estimate the tracked object's location and anticipate its return. In some embodiments, a tracked-object may leave the field of view due to the camera's orientation being moved. In such instances the tracked-object may be assigned a position in a 3d model of the environment and orientation or other motion sensors (e.g., accelerometers and gyroscopic or GPS sensors) associated with the camera may be used to estimate when the camera's field of view will move back onto the tracked object.

Content components may include, for example, audio, video, text, images, graphics, physical gestures or movements, sensory inputs/outputs (e.g., body temperature indicating feelings and emotions) or any combination thereof. In some instances, individuals may share, for example, a single piece of content which may include a video component with audio, text, and graphic annotations overlaid thereon as additional components.

As noted, systems and methods of the invention relate to temporal and spatial relationships between individual components of content. By individually defining the components, privacy permissions, authorized audiences, and ownership may be assigned at the component level. Systems and methods of the invention allow an author or authors of such content to apply a different privacy parameter for each component of the content, thereby enabling the author to select a different audience for each individual component. Systems and methods of the invention may relate to a computing device comprising at least a processor coupled to a tangible, non-transitory memory. The computing device may be, for example, a mobile device (e.g., mobile telephone or tablet computer), a wearable computing device, an augmented reality device, or a server computer. A computing device may include various input/output devices (e.g., a display, a camera, speakers, a microphone, a touchscreen, a keyboard, gestural or sensory input/output devices, or any combination thereof). The computing device may be used to generate, record, or store content or content components according to systems and methods of the invention.

A piece of content may have any number of components, for example, 1, 10 or 100. Content, according to the invention, may be generated from individual components. For example, an author may record an image component and then add a text component (e.g., a caption) in order to create a piece of content comprising two components. In some instances, content may be provided, recorded, or created as a single unit and subsequently divided (e.g., spatially or temporally) into components. For example, an author may record a 2 minute section of video and then designate a 30 second clip as one component and the rest of the video as another component. In another example, an author may provide a photograph and designate a subsection of the image (e.g., the upper left corner) as a separate component from the remainder of the image. Components of a piece of content may be designated by an author and may be received as component designations and used to define the components. These operations may be carried out by a computing device and may utilize input/output devices of the computing device.

According to systems and methods of the invention, privacy parameters may be used which allow an author to choose to make content public or private at a component level. For private content, an author may grant viewing and/or editing permissions for each component of a piece of content to an audience such as an individual or a population of viewers. A privacy parameter may be a set of permissions which allow a select audience to receive and/or observe one or more components of the content or a volatile copy thereof. A privacy parameter can be a population characteristic such as age, gender, etc. allowing only people within the selected group (e.g., males between 20 and 25 years old) to observe the content. In certain instances, components may inherit privacy parameters from other components which are honored in additional privacy parameters assigned by the author.

Content and components may be shared or distributed in a variety of ways according to the invention including, for example, by uploading content components and their temporal and spatial relationships from an author's computing device to a server from which an audience may download the content components onto their computing devices; by sending the content components directly between an author's computing device and the audience's computing devices; or where content components are uploaded to a server which in turn sends the components to the appropriate audience based on the privacy parameter associated with each component. In certain aspects, a privacy parameter may include a password, biometric and other sensory information. The privacy parameter can be entered into a computing device by the author and can be sent from the computing associated with a component and used by systems and methods of the invention to govern distribution of the component to the audience defined by the privacy parameter. An individual's inclusion within the designated audience for a content component may be verified at the server or at the author or end-user's computing device before permission to observe the content component is granted. In order to verify audience membership, the privacy parameter associated with the content component may be compared with user credentials for the prospective audience member. User credentials may include, for example, a user name, password, electronic mail address, phone number, age, gender, interests, physical attributes, geographic location, interests, nationality, biometric and other sensory information.

Where an audience has permission for only some of the content components, the content may be displayed without any effects of spatial and temporal relationships defined with respect to the unauthorized components.

Content components, according to the invention, may be shared publically or privately, with or without security and/or privacy settings. In certain aspects, content components may be distributed to intended audiences in the format of a volatile copy (e.g., that cannot be copied or forwarded or that may become unreadable after a certain amount of time after receipt, a certain number of viewings, a certain amount of viewing time, or some combination thereof). In some aspects, these volatility parameters may selected by the content component's author and may be input into a computing device through an input device such as a keyboard or touchscreen. Accordingly, content components distributed to a private audience cannot be further distributed and an author may maintain control over the end audience for private content. Transitions between pieces of content or components thereof may be accompanied by transition effects.

In certain instances, a receiving audience member may edit, annotate, comment, or otherwise respond to a content component. The audience member, upon adding a component, may be able to define the spatial and temporal relationship of that component to the existing components according to systems and methods described herein. In various embodiments, audience members may be permitted to alter the spatial and temporal relationships of existing components of received content with or without adding new components. The content component and response(s) may form a thread or conversation. In certain aspects, observation of a thread may be restricted to the audience originally defined by the content component's author based on the privacy parameter they associated with that content component. In some instances, the privacy parameter may be applied only to the original content component while subsequent responses may be treated as new content components to which each response's author may assign their own privacy parameters. In certain embodiments, when an audience member attempts to send a content component or thread to a restricted party outside of the original audience, then an alarm may be sent to the content component's author requesting permission for the thread to be observed by the restricted party. The content component author may respond to the alarm by granting permission or denying permission and/or providing volatility parameters for the copy to be received by the restricted party.

In certain cases, the content components may only be observed through certain computing devices or by a designated viewer/synthesizer computer program. In such cases, the security, privacy, and/or volatility parameters may be applied or enforced by computing device or the viewer/synthesizer computer program.

According to systems and methods of the invention, computing devices (e.g., a content component author's computing device, a server, and/or an audience member's computing device) may be in communication with each other through a communication network. A communication network may include, for example, a local area network, a wide area network, the internet, a mobile telecommunications network, or a combination thereof.

DETAILED DESCRIPTION

The invention relates to creating and managing spatial and temporal relationships between components of media content. Systems and methods described provide tools for managing the various play or run rates associated with components (e.g., video or animation speed or the speed of component movements) both relative to real time (e.g., the viewer's time) and relative to each other.

Figure 1:
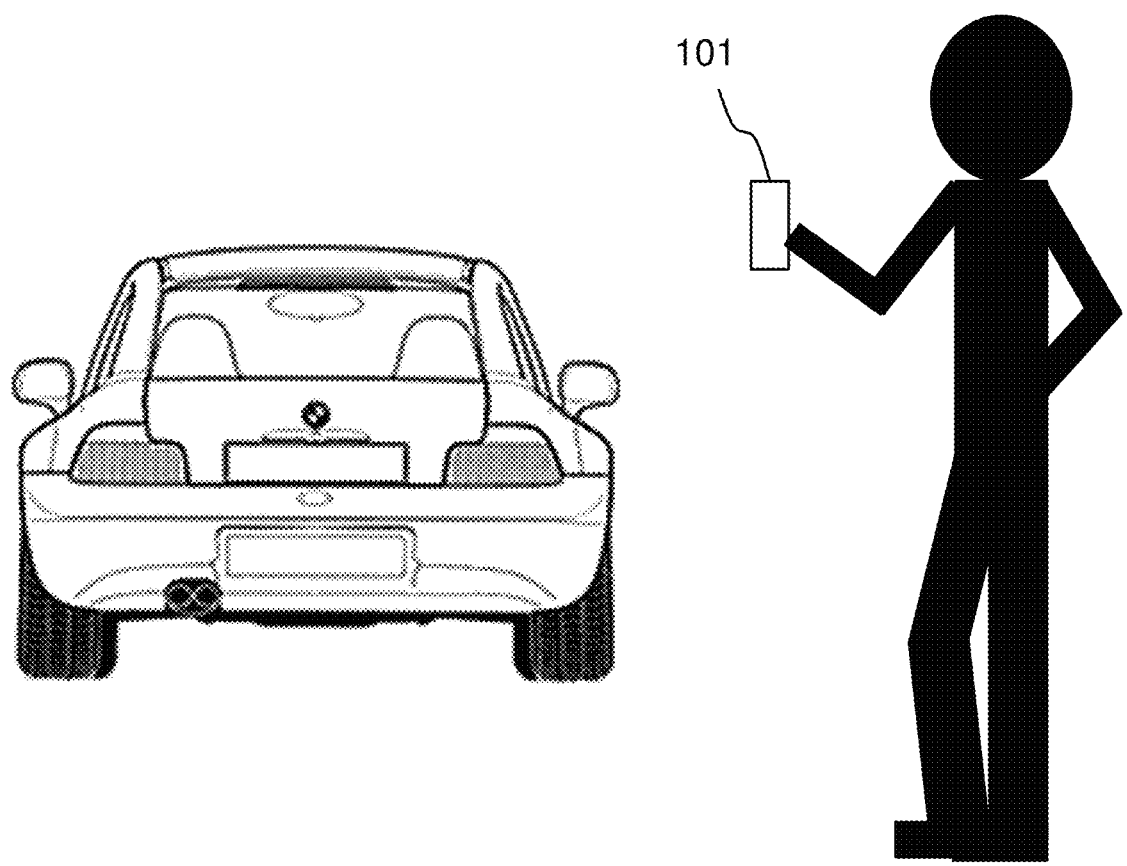
FIG. 1 shows use of a computing device to generate content.

Content components may be obtained or created using a computing device such as a desktop or laptop computer, a tablet, a mobile phone, or other device. FIG. 1 shows a user capturing a video with a computing device 101. Content components may include, for example, audio, video, text, images, graphics, physical gestures or movements, sensory inputs (e.g., body temperature indicating feelings and emotions) or any combination thereof. In some instances, individuals may share, for example, a single piece of content which may include a video component with audio, text, and graphic annotations overlaid thereon as additional components.

Figure 2:
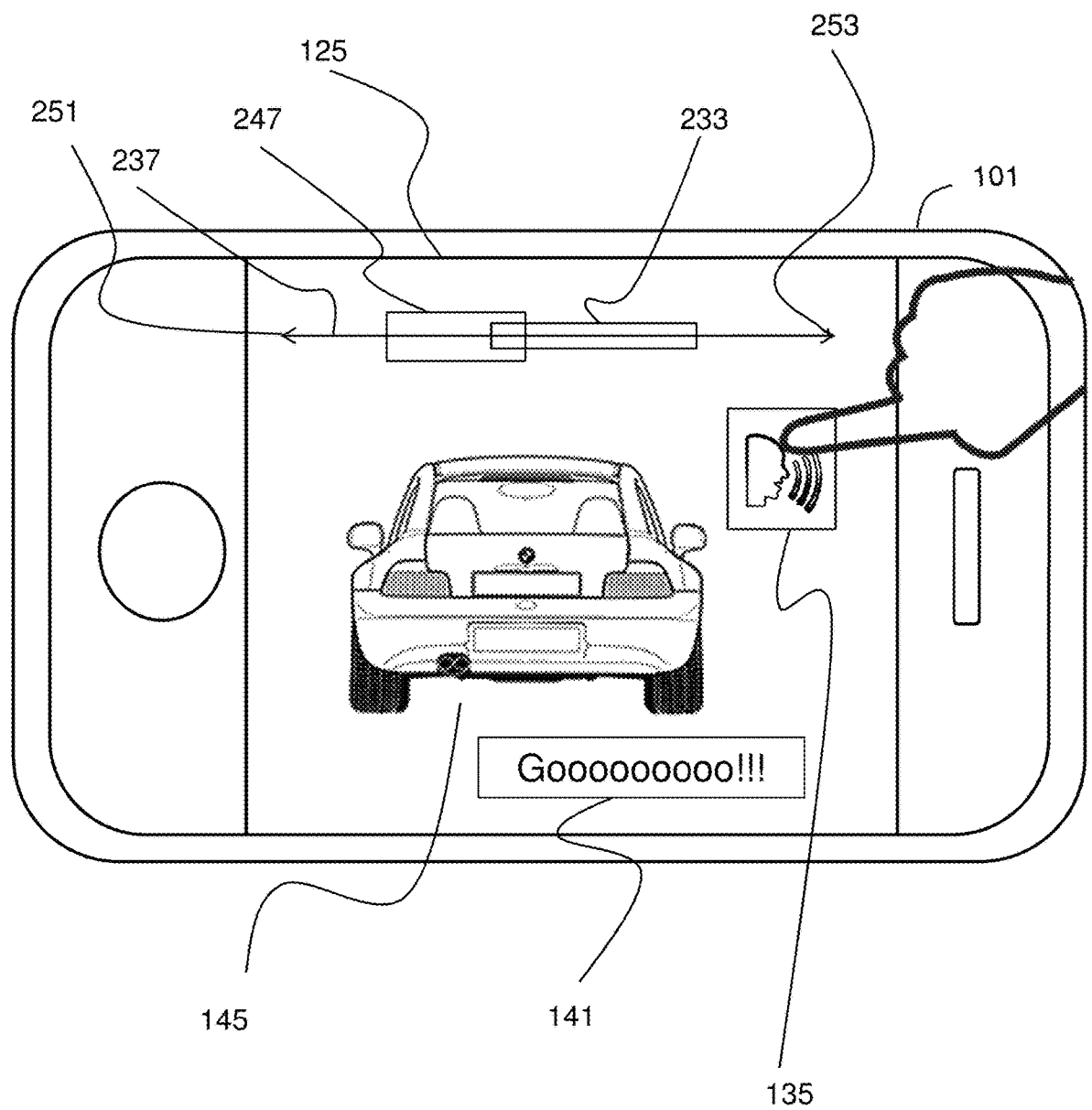
FIG. 2 shows an exemplary selection screen on a computing device display for defining spatial and temporal relationships between content components.

FIG. 2 shows an exemplary system and methods for defining spatial and temporal relationships between content components. A computing device 101, such as a mobile phone, may show the various content components using an input/output device such as a touchscreen display 125. The display may show a primary background component 145 (such as the video recorded in FIG. 1) as well as a timeline 237 associated with the run time of the primary component 145. The timeline 237 may have a first end 251 representing the start of the primary component 145 (e.g., the start of the video) and a second end 253 representing the finish of the primary component 145 (e.g., the video's completion). One or more additional components may be added to the content. Components may comprise, for example video commentary 135 and/or text annotation 141. A user may use an input device such as the touchscreen display 125 to set the location, size, and orientation of the components in relationship to each other. For example, FIG. 2 shows a user setting the location of the video commentary 135 with respect to the primary background 145 by touching the location on the touchscreen 125 where the user would like the video commentary 135 to appear. The user may also manipulate orientation and/or size using the input device. In the case of the touchscreen display 125, for example, a user may use two fingers to twist a secondary component's orientation with respect to the primary component 145 or may use two fingers spreading apart or coming together to increase or decrease the size of the secondary component in relation to the primary component 145.

Each of the secondary components may have a block shown on the timeline 237 representative of its run-time. For example, the video commentary 135 may have a first block 247 and the text annotation 141 may have a second block 233. The start and stop points of the component (e.g., the beginning and end of a video or the appearance and disappearance of text or an image) may be defined by the beginning and end of their associated blocks. A user may define the start and stop points or the run time of the secondary component (135, 141) relative to the primary component 145 by placing the representative blocks (247, 233) on the timeline 237. Stretching or condensing the size of the blocks (247, 233) relative to the primary component's 145 timeline 237 may be used to increase or decrease the run time of the secondary component (135, 141) relative to the run time of the primary component 145.

For any given point of time along the timeline, one or more of the various time-dependent components may be selected to run at real-time speed. Accordingly, that selected component will run at real-time speed while the other components will run at a speed set by the relationship defined by the timeline and component-representative blocks. For example, if a user selects a secondary video commentary to run at real time once it appears, the background primary component will proceed at real time until the secondary video commentary appears (e.g., the video commentary's block is reached on the background component). Once the secondary video commentary appears, it will play at real time (e.g., a viewer of the content will perceive the video commentary as if happening live) and the primary component will either slow down, speed up, or stay the same depending on the temporal relationship between the components defined on the timeline. In cases where the time-dependent component is audio (linked to a separate time-dependent component such as video or as an independent component), the audio component may default to real time or substantially near to it so as not to distort the audio beyond comprehension by an audience.

In certain embodiments, the temporal relationship between two or more components may be defined by syncing a specific time point in one component with a specific time point in one or more other components. For example, a secondary time-dependent component may be paused at a time point in its run-time that a user desires to sync. The primary time-dependent component may then be played or otherwise moved to a specific time point in its run time that the user desires to sync. As the primary time-dependent component reaches the desired sync point, the secondary component may be un-paused. The paused point of the secondary component will then be synced with the desired sync point in the primary component's run time. Accordingly, the two synced points will thereafter be displayed at the same time. Any modifications to the relative run speeds of the two components (e.g., one playing at real time while the other is in slow motion) will be defined around the sync points. In other words, the sync point may form a temporal anchor such that the two sync points will always be displayed at the same time regardless of the rest of the temporal relationship between the two components.

Temporal relationships between time-dependent components and real time may by static or dynamic (e.g., change during playback). Dynamic temporal relationships may be linear or otherwise (e.g., exponential or sinusoidal). Relative run speed of components may be defined by interest or importance level as indicated by a user or audience. For example a user or audience member, recording or viewing a time-dependent component may indicate their interest at various points during the run time of the time-dependent component through an input/output device such as a touch screen. In certain embodiments, a user creating content such as a video may interact with a button, slider, or other input device (either physical or graphically represented on a display) to indicate the importance of the images being captured in real time as the video is recording or afterward during a viewing of the recorded video. The indications of importance may range from two values (e.g., not interesting and interesting) to hundreds or more (e.g., a slider with hundreds of distinguishable positions between important and not important). After different frames of the video or other time-dependent component have been assigned a level of importance or interest, the run speed may be coordinated to those indications either automatically or with user input. For example, portions of the time-dependent component that have a lower importance indication may run at a faster speed (relative to real time and/or relative to other components) during playback while portions that have a higher importance indication may run at a slower speed.

Time-dependent components may include moving animations or videos or spatial manipulation of otherwise still components (e.g., pictures and text). For example, a still image may become a time-dependent component with the addition of transitions or features such as zooming or panning the image. A text component may undergo a transition such as each letter appearing one by one or the entire text fading in or out. In such cases, the speed of the pan, zoom, or other transition or animation forms the time-dependent part of the component and can be manipulated according to systems and methods of the invention.

In certain embodiments, spatial relationships may be defined as a function of the temporal relationship. For example, the position, size, and/or orientation of a secondary component with respect to a primary component may be changed over the run time of the primary or secondary component. The spatial-temporal relationship may be defined by manipulating the relative size, orientation, and position of one of the components while the other component is being run (e.g., a video being played, zooming in or out or panning over an image, or an animation being run). For example, in reference to FIG. 2, the primary component 145 may be played at any speed and, while the primary component 145 progresses along the time line 237, a user may alter the size, position or orientation of a secondary component (135, 141) as discussed above and thereby cause the spatial changes to be associated with a temporal aspect of the primary component 145. A user may drag the video commentary 135 component from one position overlaying the primary component 145 to another while the component is playing and, upon playback, the video commentary 145 component will then track those spatial positions at the corresponding temporal positions. The relative size, orientation, and position may thereby be set for each time point along the run time of one or more of the components and stored in memory to be replayed.

Because locations of secondary components may be defined by a user over the run time of a primary component, systems and methods allow for user tracking of pixels or other sub-sets of a component. For example, those techniques may be used to define a portion of a primary, background component to be obscured or otherwise embellished (e.g., one or more faces in a video). In such an instance, the secondary component would be the embellishment which may include a filter to blur or pixelate the primary component at that location. A user may use an input device such as a finger on a touch screen to track the portion of the primary component to be embellished as the time-dependent primary component is played. In such embodiments, the size of the embellishment or secondary component may be defined, for example, by the pressure of the finger on the touch screen.

Figure 3:
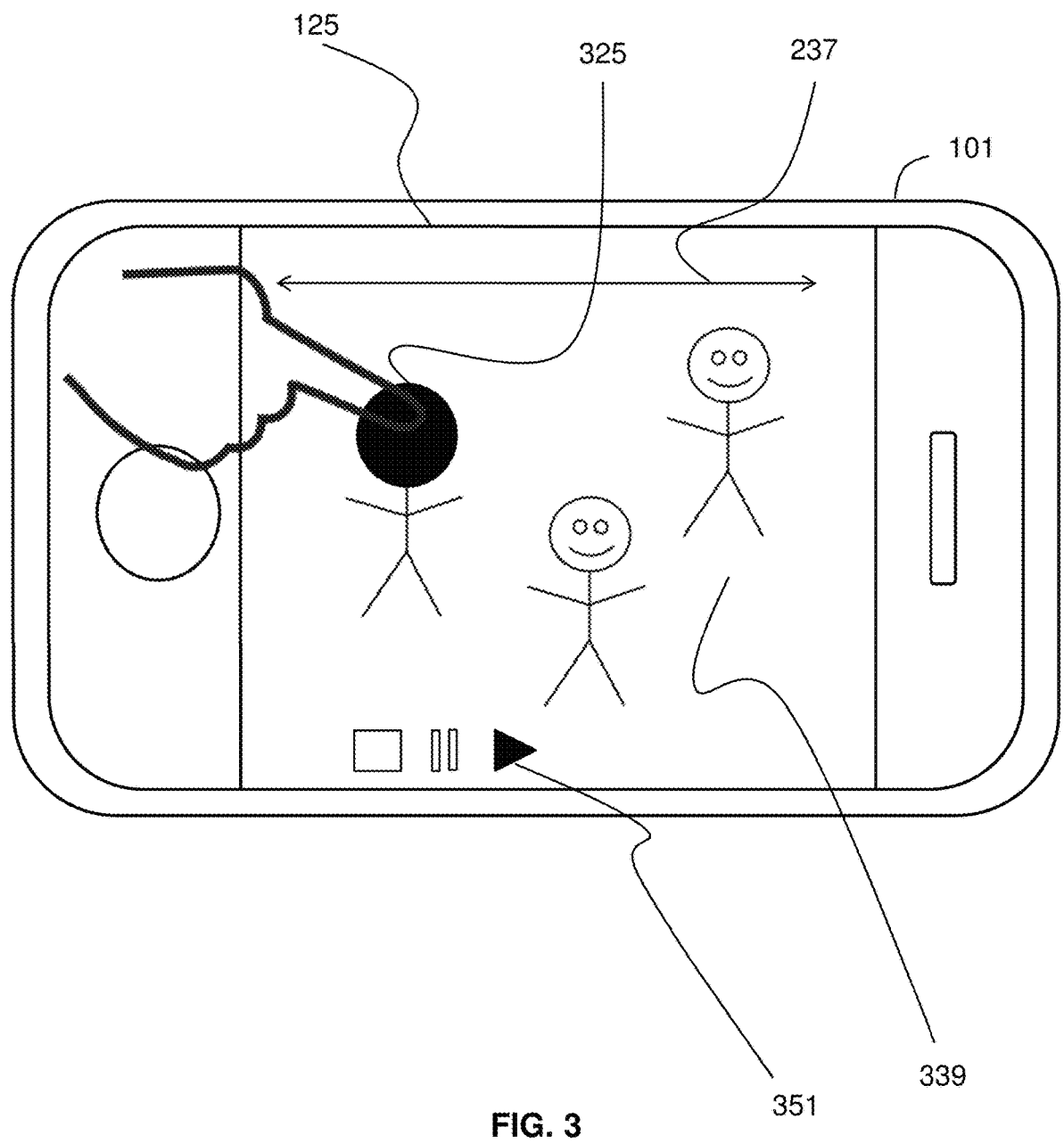
FIG. 3 shows an exemplary selection screen on a computing device display for defining spatial relationships between content components as a function of time.

FIG. 3 illustrates defining spatial relationships between content components as a function of time. A primary component 339 (e.g., a video) is played on a touchscreen 125 of a computing device 101. As the primary component 339 progresses along the timeline 237 through its runtime, a user may use an input device such as a finger on the touchscreen 325 to define the spatial relationship of a secondary component 325, such as a filter, animation, picture, text, or other embellishment as a function of the primary component's 339 timeline 237. Using such systems and methods, a user may track a subset of the primary component 339 such as a face in a video. By using a secondary component 325 such as a filter that obscures the underlying primary component 339, those systems and methods can be used to hide the identity of someone in the video by obscuring their face. In certain embodiments, the size of the secondary component 325 (e.g., the size of the obscured area) may be defined temporally based on the pressure on the touchscreen 125 at a given time along the timeline 237 (e.g. more pressure obscures a larger area).

Further embodiments may include automatic tracking of a defined portion of a component (e.g., a face in a video) with spatial memory and anticipation. For example, techniques for automatic pixel tracking are known in the art but struggle with tracked portions leaving and returning to an image frame. These techniques may rely on defining edges based on color changes in pixels and tracking those edges or the pixels as they move throughout an image frame or camera's field of view. If the object leaves the field of view and then returns, there is generally a delay before the computer recognizes that the tracked object has reappeared and should be modified. Systems and methods of the invention address this delay by tracking the object out of frame and/or anticipating the location of the object's return to frame in order to identify the object as soon as it enters the field of view. For example, the out-of-frame location of the tracked object may be estimated based on the recorded speed and trajectory of the object in-frame. A computer may create a model of the environment outside of the field of view based, for example, on panning of the camera, through GPS, or other means to contribute to out-of-frame location determination based on the location of, for example, walls or other objects that may affect the tracked object's movement. Sensors associated with the object may also be tracked (e.g., a cell phone or other device monitored via GPS or Wi-Fi triangulation) and their relationship to the tracked object may be used to estimate the tracked object's location and anticipate its return. In some embodiments, a tracked-object may leave the field of view due to the camera's orientation being moved. In such instances the tracked-object may be assigned a position in a 3d model of the environment and orientation or other motion sensors (e.g., accelerometers and gyroscopic or GPS sensors) associated with the camera may be used to estimate when the camera's field of view will move back onto the tracked object. Systems and methods may track objects forward and backward in a video to help define movement patterns, anticipate future movements, or to retroactively apply an embellishment.

The various content components according to the invention may be assigned different privacy parameters. Separate components may be designated within a single piece of content or dividing the content into separate components. By allowing an author to selectively share different components of a piece of content with different audiences, systems and methods of the invention allow an author to quickly communicate and share experiences with multiple audiences while maintaining the appropriate level of privacy for each audience. The invention provides tools for maintaining author control over privacy and distribution of a content component by allowing for the distribution of volatile copies of content components with volatility parameters which may be selected by the author. By building in selectable ephemerality and/or copying and forwarding restrictions, secondary sharing of private content may be prevented.

Where an audience does not have permission to view a component, the content may be displayed as if the forbidden component (including its temporal and spatial definitions discussed above) were not there. Accordingly, if a forbidden component was set as the real time component for a section of the content (e.g., the other component's run speed was defined in relation to the forbidden component) display without the forbidden component would result in the content run speed defaulting to the primary component or some other component being displayed in real time with other temporal relationships defined in context of that new default timeline.

Content components may include, for example, pre-existing, generated, or captured still images, audio, video, text, verbal annotations, vector graphics, rastor graphics, physical gestures or movements, sensory inputs (e.g., body temperature indicating feelings and emotions) or any combination thereof. Content may be generated or captured using an input device (described later) on a mobile device or other computing device 101. In preferred embodiments, content is a computer file capable of being read by a computing device 101 or server 511. A variety of known programs or applications may be used to generate or capture content and content may be in a variety of known file types including, for example, JPEG, GIF, MPEG, Quick Time File Format (QTFF), ASCII, UTF-8, MIME, .TXT, XML, HTML, PDF, Rich Text Format (RTF), and WordPerfect. FIG. 1 shows a computing device 101 being used to generate new content by capturing a digital image.

A piece of content may have any number of components, for example, 1, 10, 100, or more. Preferably a piece of content has at least 2 components. Content, according to the invention, may be generated from individual components or may be divided into separate components. Different components of a single piece of content may be of the same or different types. For example, a piece of content may include a video component, a text component, and an audio component. In another example, a piece of content may include two separate image components or two separate text components. An example of creating content from multiple components includes an author recording an image component and then adding a text component (e.g., a caption) in order to create a piece of content comprising two components. In certain embodiments, content components may include annotation, augmentation, overlay, or a change to another component including, for example, audio annotation, text, vector graphics, rastor graphics, video, animation, gestures for wearable computing devices 101, instructions, code for two-dimensional or three-dimensional environments, or a combination thereof.

In some instances, content may be provided, recorded, or created as a single unit and subsequently divided into components. In certain aspects, a piece of content may be divided temporally. For example, an author may record a 2 minute audio clip and then designate a 30 second section of the clip as one component and the rest of the audio as another component. The author may then designate each component with a different privacy parameter so that some audiences may observe the entire audio clip, which may include private information while others may only hear the 30 second section which may omit the private information.

In certain aspects, components of a piece of content may be designated by an author through the input of component designations which are used to define the components. These operations may be carried out by a computing device and may utilize input/output devices of the computing device. In some embodiments, a piece of content may be divided spatially into components. For example, an author may provide a photograph (e.g., an image of a boy and a girl next to each other) and designate a portion of the image as a separate component (e.g., the portion of the image depicting the girl) from the remainder of the image. A different privacy parameter can then be assigned to each component of the image so that some audiences might view the entire image while others may only view one component of the image. Component designations may be input in a variety of manners including, for example, in the spatial partitioning described above, an author may display the image on a computing device 101 display 125 with a touch screen and may use a stylus or finger to designate a separate component by drawing an enclosed shape over a portion of the image on the display 125. That portion of the image may then be designated as one component while the rest of the image is another component, each of which may receive different privacy parameters and may have their spatial and temporal identities be defined separately.

In certain embodiments, systems and methods of the invention may relate to pre-designating components within a piece of content and prompt an author for privacy parameters for each component. For example, a computing device 101 may divide a piece of content based on different media types within a piece of content (e.g., designating an image with text overlay as an image component and a text component).

Figure 4:
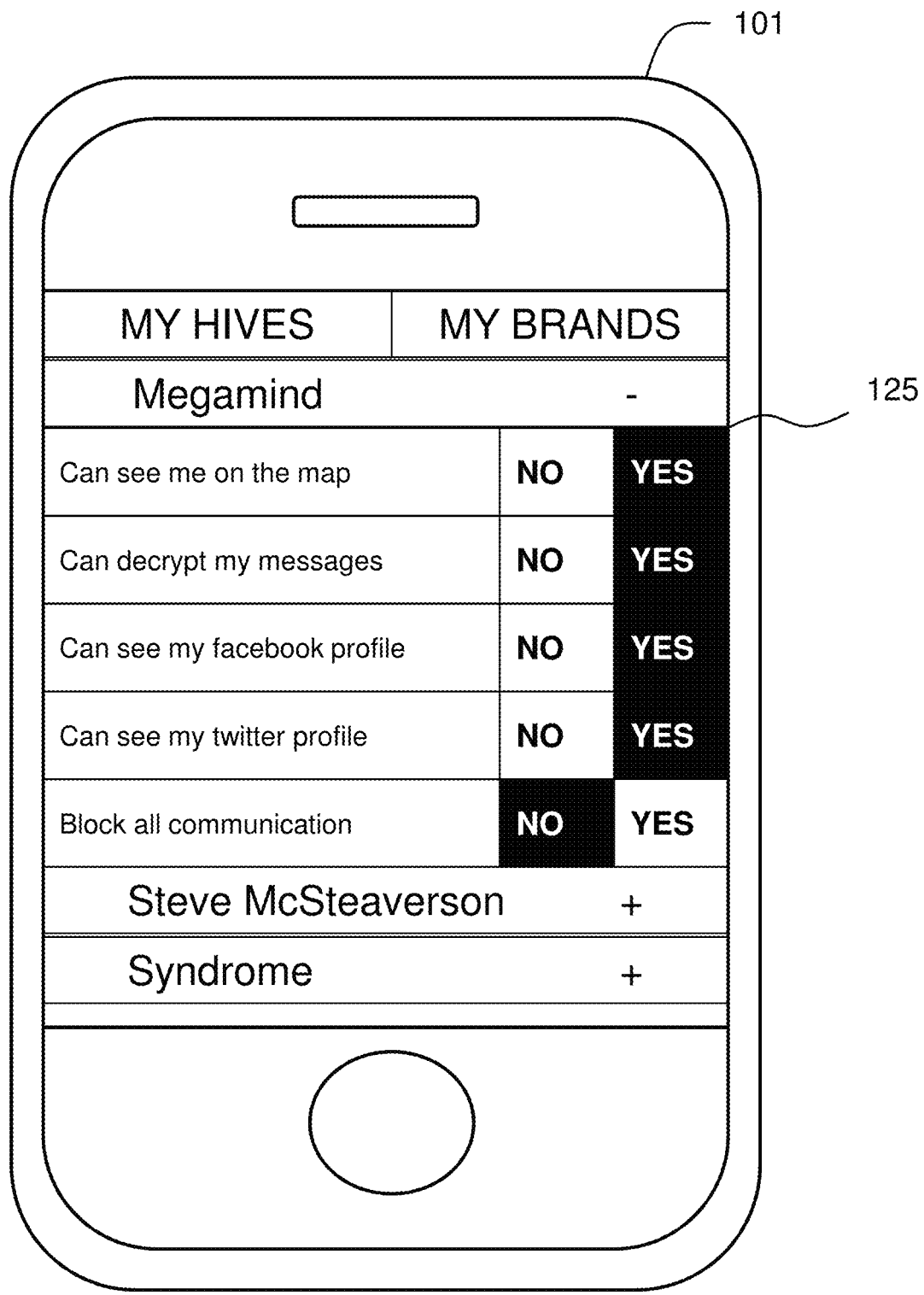
FIG. 4 shows an exemplary computing device displaying a privacy parameter selection screen.

Content components may be assigned a privacy parameter or may have no privacy parameters (i.e., public content). In some embodiments, an author may create a privacy parameter associated with a component of content input that parameter into a computing device to associate with the designated component. Privacy parameters may define an audience for a content component. In certain embodiments, an audience may refer to the individual or group of individuals whom the author intends a content component to be observed by. A privacy parameter may be a selection of one or more individuals or users whom the author has authorized to receive the content as a designated audience. A privacy parameter may also be a set of criteria or population characteristics which define a group that the author has authorized to receive the content. Examples of criteria or population characteristics include, for example, age, gender, interests, physical attributes, geographic location, education, or nationality. In certain aspects, a privacy parameter may include biometric and other sensory information. FIG. 4 illustrates an embodiment wherein a computing device 101 with a display 125 is showing an exemplary privacy parameter selection screen. As depicted in FIG. 4, an author may identify an audience for private designated content by toggling a button on a touchscreen indicating whether or not an individual user may decrypt messages from the author. In this example, an author can preselect an audience able to observe content components the author designates as private.

Figure 6:
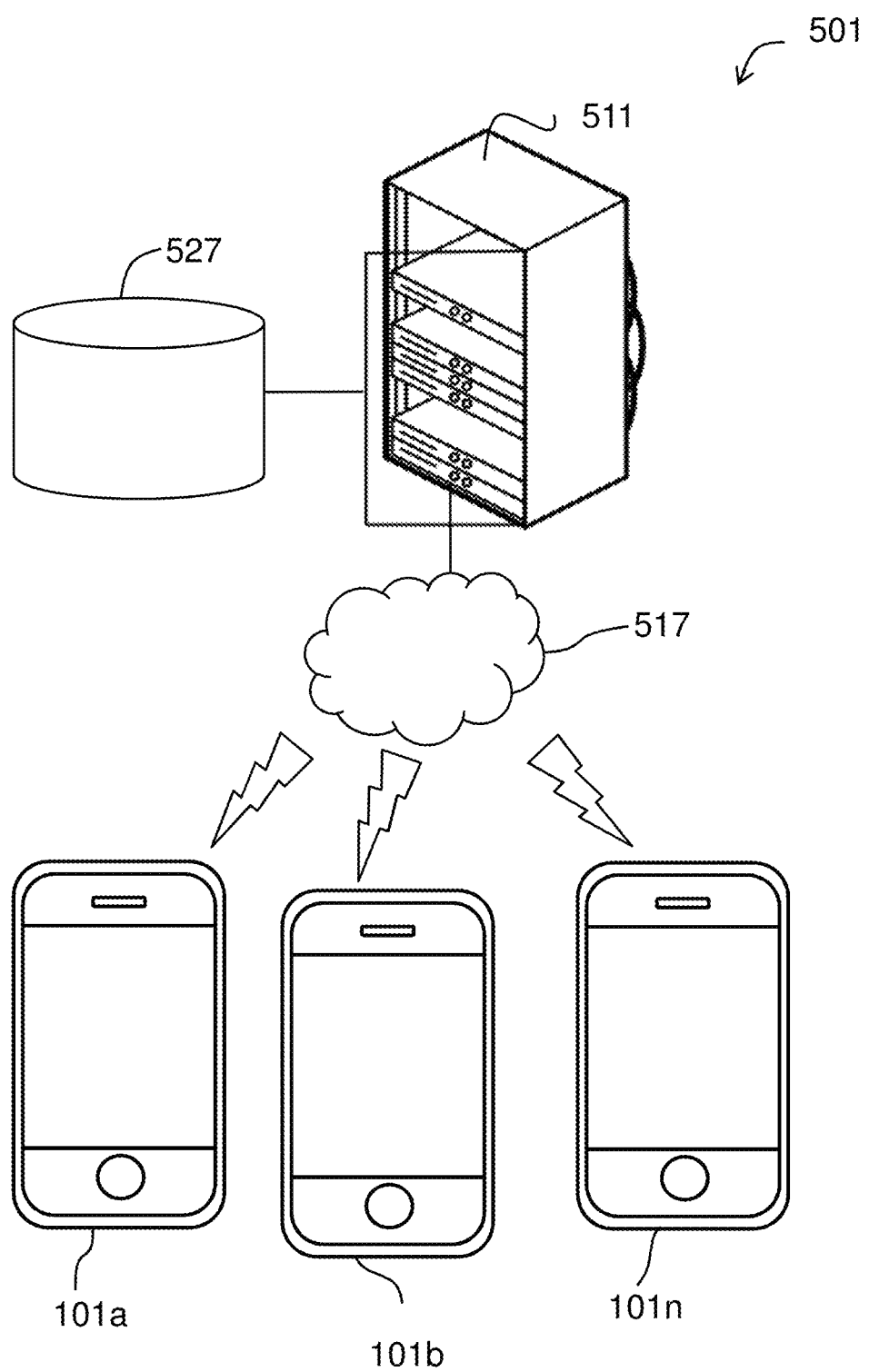
FIG. 6 shows a system for sharing public and private content over a communication network.

In certain aspects, content and content components may be shared or distributed by uploading content components from an author's computing device 101, through a communication network 517, to a server 511 from which an audience may download the content components onto their computing devices 101. In some embodiments, once uploaded to a server 511, the server 511 may send the components to the appropriate audiences through a communication network 517 based on the privacy parameter associated with each component. An exemplary server 511 implemented system 501 of the invention is depicted in FIG. 6 wherein multiple computing devices 101a, 101b . . . 101n, including a server 511 with a data storage device 527, are coupled to a communication network 511 through which they may exchange data. The server 511 may store received data including, privacy parameters, content, content components, volatility parameters, component designations, and user credentials.

In certain embodiments, content components may be distributed by sending the content components directly between an author's computing device 101 and the computing devices 101 of the audience. According to certain systems and methods of the invention, content transferred among computing devices 101, including servers 511, may be compressed and/or encrypted using a variety of methods known in the art including, for example, the Advanced Encryption Standard (AES) specification and lossless or lossy data compression methods. Servers 511 according to the invention can refer to a computing device 101 including a tangible, non-transitory memory coupled to a processor and may be coupled to a communication network 517, or may include, for example, Amazon Web Services, cloud storage, or other computer-readable storage. A communication network 517 may include a local area network, a wide area network, or a mobile telecommunications network.

In certain aspects, volatility parameters may be associated with content components. In some instances, these volatility parameters may be static, may be received from an author and assigned to a specific content component, or may be assigned based on privacy parameter (e.g., one volatility parameter for all private components and another for all public components). Volatility parameters may relate to the viewing time, number of views, or lifespan of distributed content components. In some embodiments, components (public, private, or both) may only be distributed other than the author in a volatile format. In certain embodiments, content may be formatted so that it can only be compiled from components and/or viewed using a viewer/synthesizer program or on a computing device 101 of an audience member. In certain aspects, privacy parameters and/or volatility parameters may be enforced by a distributing server 511, an author's computing device 101, the computing device 101 of an audience member, and/or a viewer/synthesizer program. In certain aspects, the computing device and/or the viewer synthesizer program may have system write permission, and may erase the content upon expiration of a volatility parameter. In some embodiments, the computing device and/or the viewer synthesizer program may refuse to display the content upon expiration of a volatility parameter. In certain embodiments, the computing device and/or the viewer synthesizer program can periodically review the status of volatile data and apply the restrictions or update the status.

Figure 5:
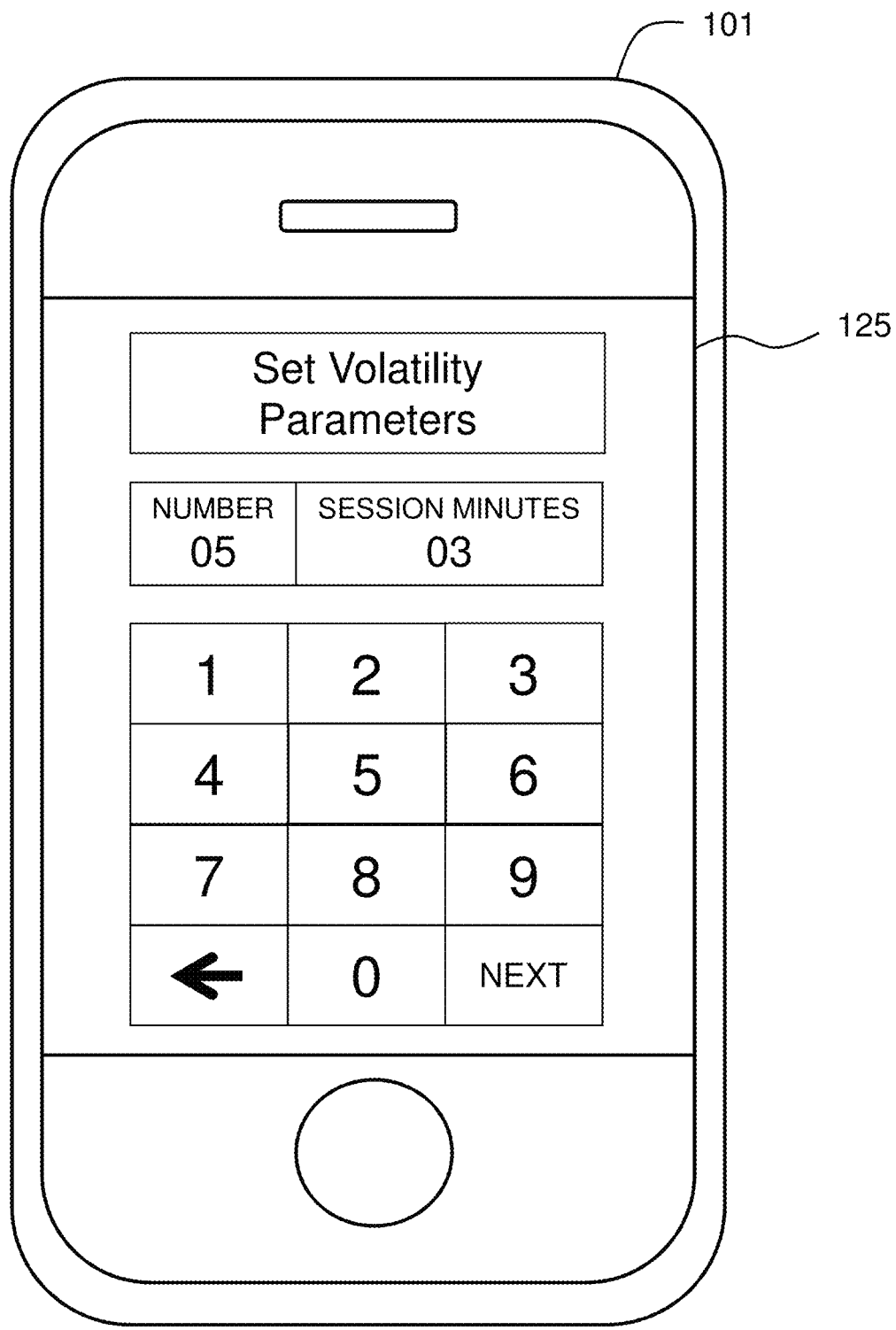
FIG. 5 shows an exemplary volatility parameter selection screen on a computing device display.

In various aspects, a downloaded copy of content may not be for example, shared, transferred, or copied. Volatile copies of content may have a preset lifespan after which the file is expunged from the computing device 101 on which it is stored or corrupted and made unreadable. In certain embodiments, volatile copies may allow only a limited number of observations by the audience. For example, a volatile copy of content may be distributed to an audience in a volatile format which allows the audience to observe the content five times for thirty seconds each time. Number of observations and/or time of observation limitations, as described above, may be preset or may be selected for a piece of content, a component, or group of components by an author. For example, an author may, upon providing a content component (e.g., taking a digital photograph, entering a text comment, or identifying an audio clip component), set one or more volatility parameters including a preselected amount of time for observation or a preselected number of observations. These volatility parameters may be applied, for example, on a content basis or on an audience basis. For example, an author may set a single volatility parameter (e.g., a preselected number of observations) for all audiences for an individual component or piece of content, or may set a single volatility parameter for all components sent to a particular audience. FIG. 5 illustrates an exemplary embodiment of a computing device 101 with a display 125 allowing a user to set volatility parameters including a number of observation sessions and the amount of time for each session.

In certain aspects systems and methods of the invention may include the creation of an account in order to access and share content using the system or methods of the invention. Creation of an account may include entering user credentials into a computing device 101 and can include creating a user name to associate with the credentials. These user credentials can be uploaded through the communication network 517 to a server 511 and stored in the server's memory or may be received by a computing device 101 and stored in its memory. When a privacy parameter is applied to a content component by an author, the privacy parameter may be compared to a putative audience member's user credentials to determine whether or not they fall within the privacy parameter and can observe the component. This comparison may be performed in a variety of ways depending on the method of distribution. For example, if the component is sent directly from an author's computing device 101, the computing device may compare the privacy parameter for the component to various user credentials stored in its memory or may receive user credentials from a server 511 or from putative audience members' computing devices 101 before comparing them to the privacy parameter. Upon comparing, the computing device may determine an audience for the content and distribute the component to the audience. Where components are uploaded to a server 511, the server 511 may also receive a privacy parameter associated with the component and may compare the privacy parameter to user credentials stored in its memory or received from putative audience members and, upon comparing, distribute the component to individuals whose user credentials match the privacy parameter for the component. In certain aspects, observation permission may be determined at the end user level wherein a putative audience member may receive a copy of the component which can only be observed with a viewer/synthesizer program on the user's computing device 101. The putative audience member may also receive a privacy parameter associated with the component which the putative audience member's computing device may compare to her user credentials which may be stored on the computing device's memory. Then, the putative audience member's viewer/synthesizer program may only open the content component for observation if the privacy parameter matches the putative audience member's user credentials.

In certain aspects, a receiving audience member may edit, annotate, comment, or otherwise respond to a content component. The content component and response(s) may form a thread or conversation. In certain aspects, observation of a thread or the components thereof may be restricted to the audience originally defined by the content component's author based on the privacy parameter they associated with that content component. In some instances, the privacy parameter may be applied only to the original content component while subsequent responses may be treated as new content components to which each response's author may assign their own privacy parameters. In certain embodiments, when an audience member desires or attempts to send a content component or thread to a restricted party outside of the original audience the audience member's computing device 101 or the server 511 may send a notification, through the communication network 517 to the author seeking approval for observation by a party outside of the originally intended audience to view the component. The notification may be sent, for example, as an electronic mail, a text message, or through a dedicated portal to a computing device 101 (e.g., an author's mobile telephone) over a communication network 517. The computing device 101, having received a notification, may identify the new putative audience based on user credentials and/or prompt the author for permission to release the component to the requestor. In various aspects, the author may send a one-time authorization to release a private component to a particular audience outside of the original privacy parameter. In some embodiments, an author may alter the privacy parameter associated with the component (e.g., change a component from private to public). In certain embodiments, where a particular audience has permission to view some components of a piece of content and not others, the components which the audience does not have permission to observe may be hidden so that the restricted audience is unaware of the additional, restricted components.

In certain embodiments, transition effects may be provided to enhance transitions between various pieces of content, multiple privacy parameters, or different components within an individual piece of content. For example, an audience member may view a piece of content on a computing device wherein the content contains multiple components with different privacy parameters. A piece of content may contain a public component such as text comment about a concert that the author attended, along with a private component, such as an image of the author with a girl at the concert. An audience member may initially observe a public component of the piece of content on a computing device 101 and, if they have permission to view the private component, may interact with their computing device through an input/output device 305 to transition between the public component and private component. An individual belonging to more than one audience (e.g., public and private) may be referred to as an overlap audience. Transition effects can provide overlap audiences with a transition between content viewable by a first audience and content viewable by a second audience where the overlap audience comprises individuals belonging to both the first and second audiences.

Transition effects may include visual effects such as a scratching effect wherein the user, through a touchscreen or other input/output device 305, is shown a visual representation of scratching through a first component to reveal a second component as the user swipes their finger, drags a mouse pointer, or otherwise interacts with their computing device 101. Transition effects may include visual effects (e.g. scratching, peeling, tearing, fading, swiping in a direction, or minimizing/maximizing) as well as audio effects (e.g., a scratching sound accompanying the visual scratching effect). Transition effects may be selected by a content author or an audience member viewing a piece of content and may be applied to individual pieces of content or set generally for all pieces of content or groups of content. A single piece of content may comprise multiple different transition effects to transition between multiple components. In certain aspects, a transition effect may be selected by an author to occur at a selected time (e.g., after an audience member has viewed the first component for a set amount of time or at a certain time of day) or may be initiated by the audience member (e.g., the swiping interaction described above).

In various embodiments, systems 501 and methods of the invention may relate to a communication network 517 which allows a server 511 coupled to a data storage device 527 and other computing devices 101a, 101b, . . . , 101n to transfer data amongst themselves. This data can include content components, privacy parameters, volatility parameters, volatile copies of content components, component designations, and/or user credentials, for example. See FIG. 6. Data can be stored in the memory of any computing device including the server's 511 internal memory 307 or in a data storage device 527. Computing devices 101a, 101b . . . 101n according to systems and methods of the invention may be operable to send, receive, and store content components, volatile content, editing parameters, notifications, content identifiers, volatility parameters, content requests, user credentials, component designations and/or privacy parameters.

Figure 7:
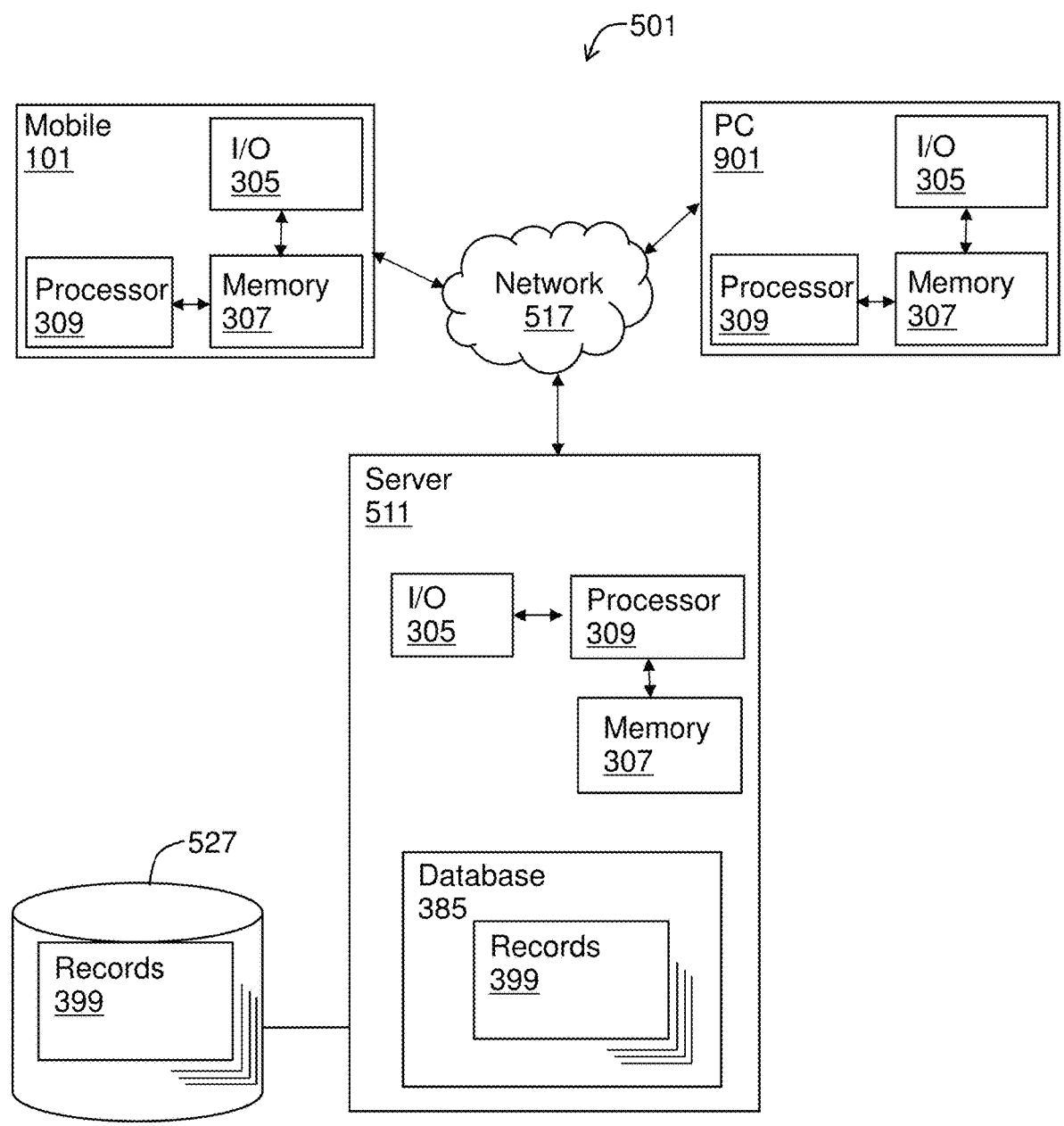
FIG. 7 gives a more detailed schematic of components that may appear within a system.

In a preferred embodiment, computing devices 101 according to the invention may provide a user, editor, or author, with an intuitive graphical user interface (GUI). FIG. 7 gives a more detailed schematic of components that may appear within system 501. System 501 preferably includes at least one server computer system 511 operable to communicate with at least one computing device 101a, 101b via a communication network 517. Sever 511 may be provided with a database 385 (e.g., partially or wholly within memory 307, storage 527, both, or other) for storing records 399 including, for example, content components, privacy parameters, volatility parameters, volatile copies of content components, component designations, and/or user credentials where useful for performing the methodologies described herein. Optionally, storage 527 may be associated with system 501. A server 511 or computing device 101 according to systems and methods of the invention generally includes at least one processor 309 coupled to a memory 307 via a bus and input or output devices 305.

As one skilled in the art would recognize as necessary or best-suited for the systems and methods of the invention, systems and methods of the invention include one or more servers 511 and/or computing devices 101 that may include one or more of processor 309 (e.g., a central processing unit (CPU), a graphics processing unit (GPU), etc.), computer-readable storage device 307 (e.g., main memory, static memory, etc.), or combinations thereof which communicate with each other via a bus.

A processor 309 may include any suitable processor known in the art, such as the processor sold under the trademark XEON E7 by Intel (Santa Clara, Calif.) or the processor sold under the trademark OPTERON 6200 by AMD (Sunnyvale, Calif.).

Memory 307 preferably includes at least one tangible, non-transitory medium capable of storing: one or more sets of instructions executable to cause the system to perform functions described herein (e.g., software embodying any methodology or function found herein); data (e.g., portions of the tangible medium newly re-arranged to represent real world physical objects of interest accessible as, for example, a picture of an object like a motorcycle); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage 527 such as, for example, Amazon Web Services, memory 307 of server 511, cloud storage, another server, or other computer-readable storage. Cloud storage may refer to a data storage scheme wherein data is stored in logical pools and the physical storage may span across multiple servers and multiple locations. Storage 527 may be owned and managed by a hosting company. Preferably, storage 527 is used to store records 399 as needed to perform and support operations described herein.

Input/output devices 305 according to the invention may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof.

One of skill in the art will recognize that any suitable development environment or programming language may be employed to allow the operability described herein for various systems and methods of the invention. For example, systems and methods herein can be implemented using Objective-C, Swift, C, Perl, Python, C++, C#, Java, JavaScript, Visual Basic, Ruby on Rails, Groovy and Grails, or any other suitable tool. For a computing device 101, it may be preferred to use native xCode or Android Java.

As used herein, the word "or" means "and or or", sometimes seen or referred to as "and/or", unless indicated otherwise.

Incorporation by Reference

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A system for creating and managing multi-component content, the system comprising:
   a computing device comprising a tangible, non-transitory memory coupled to a processor, the computing device operable to:
   receive a plurality of time-dependent components comprising at least a primary component and a secondary component;
   provide an interface with which a user can interact through an input device to define one or more temporal relationships between the primary component, the secondary component, and real time, one or more spatial relationships between the primary component and the secondary component, and independent authorized audiences for the primary component and the secondary component;
   identify and track a position of a moving portion of the primary component out of a field of view of the primary component and anticipate a position of reentry into the field of view of the primary component; and
   define the one or more spatial and temporal relationships between primary and secondary components such that the secondary component's position tracks the position of the portion of the primary component,
   wherein the interface comprises a timeline representing real time, a first object representing run time of the primary component and a second object representing run time of the secondary component wherein changing the size of the first or second object relative to the timeline on the interface changes playback speed of the primary or secondary components respectively, and
   wherein display of the first and second components is dependent on audience authorizations for the first and second components.

2. The system of claim 1 wherein the one or more spatial relationships are defined in terms of the one or more temporal relationships.

3. The system of claim 1 wherein the interface comprises a display showing a first object representing the primary component and a second object representing the secondary component wherein a spatial relationship between the first and second objects at a displayed frame of a run time for the multi-component content defines the one or more spatial relationships between the primary and secondary components for the displayed frame and wherein the user can define the one or more spatial relationships with the input device by moving the first object and the second object with respect each other in the interface for each displayed frame of the run time for the multi-component content.

4. The system of claim 3 wherein the interface comprises a display showing the primary component and the secondary component wherein a temporal relationship between the first and second objects may be defined by a user selecting on the input device a frame in run time of the secondary component and syncing it to a frame in run time of the primary component wherein the computing device then determines a start time for the secondary component and a run speed such that, during playback of the multi-component content, the selected frame in the run time of the secondary component appears at the same time as the synced frame in the run time of primary component.

5. The system of claim 3 wherein relative size of the primary and secondary components is defined by a user interacting with the interface through the input device to change relative size of the first and second objects.

6. The system of claim 5 wherein the input device comprises a touchscreen and the user can define the spatial relationship between the primary and secondary components by moving the first and second objects with a finger on the touchscreen.

7. The system of claim 6 wherein the user can define a size relationship between the primary and secondary components with pressure of the finger on the touchscreen.

8. The system of claim 7 wherein increasing the pressure of the finger on the touchscreen over the first or second object increases the relative size of the corresponding primary or secondary component.

9. The system of claim 1 wherein the interface comprises a display configured to playback each of the plurality of time-dependent components and the user can interact with the interface through the input device to assign a relative importance to each of a plurality of frames in run time of each of the plurality of time-dependent components, and wherein the computing device assigns a playback speed for each of the plurality of frames in the run time of each of the plurality of time-dependent components based on its assigned relative importance.

10. The system of claim 9 wherein the computing device assigns a slower playback speed to a frame assigned a lower relative importance than a playback speed assigned to a frame assigned a higher relative importance.

11. The system of claim 1 wherein the primary and secondary components comprise an image, video, text, or audio.

12. A system for creating and managing multi-component content, the system comprising:
   a computing device comprising a tangible, non-transitory memory coupled to a processor, the computing device operable to:
   receive a plurality of time-dependent components comprising at least a primary component and a secondary component;
   provide an interface with which a user can interact through an input device to define one or more temporal relationships between the primary component, the secondary component, and real time, one or more spatial relationships between the primary component and the secondary component, and independent authorized audiences for the primary component and the secondary component;

identify and track a position of a moving portion of the primary component out of a field of view of the primary component and anticipate a position of reentry into the field of view of the primary component; and define the one or more spatial and temporal relationships between primary and secondary components such that the secondary component's position tracks the position of the portion of the primary component, wherein the interface comprises a display showing a first object representing the primary component and a second object representing the secondary component wherein the interface is operable to change relative position, size, and orientation of the first and second objects at a displayed frame of the multi-component content in response to movements of the first object relative to the second object on the interface for each displayed frame, and wherein display of the first and second components is dependent on audience authorizations for the first and second components.

13. The system of claim 12 wherein computing device is further operable to estimate the position of reentry based on the recorded speed and trajectory of the portion in the field of view.

14. The system of claim 13 wherein the computing device is further operable to create a model of an environment outside of the field of view of the primary component.

15. The system of claim 14 wherein the computing device is further operable to create the model of the environment outside of the field of view of the primary component using visual data from the primary component or GPS to locate objects outside of the field of view that affect the portion's movement.

16. The system of claim 12 wherein the computing device is further operable to track one or more sensors associated with the portion and use a spatial relationship between the one or more sensors and the portion to anticipate the position of reentry.

* * * * *